United States Patent [19]

Vaders

[11] Patent Number: 4,781,228

[45] Date of Patent: Nov. 1, 1988

[54] TREE PRUNER

[75] Inventor: Dennis H. Vaders, State Road, N.C.

[73] Assignee: Weyerhaeuser Company, Tacoma, Wash.

[21] Appl. No.: 85,834

[22] Filed: Aug. 17, 1987

[51] Int. Cl.⁴ .......................... A01G 23/02; B27L 1/00
[52] U.S. Cl. .................................. 144/2 Z; 144/3 D; 144/343
[58] Field of Search .................... 144/2 Z, 3 D, 34 R, 144/343

[56] References Cited

U.S. PATENT DOCUMENTS

| | | | |
|---|---|---|---|
| 2,948,311 | 8/1960 | McCollum | 144/2 Z |
| 3,371,692 | 3/1968 | Larson et al. | 144/2 Z |
| 3,385,332 | 5/1968 | Otterbach et al. | 144/2 |
| 3,643,708 | 2/1972 | Lindblom | 144/2 Z |
| 3,797,539 | 3/1974 | Moser | 144/2 Z |
| 3,981,336 | 9/1976 | Levesque | 144/2 Z |
| 4,004,622 | 1/1977 | Hamilton | 144/2 Z |
| 4,049,032 | 9/1977 | Oldenburg | 144/2 Z |

FOREIGN PATENT DOCUMENTS 2720149 11/1978 Fed. Rep. of Germany .

OTHER PUBLICATIONS

CSIRO Division of Forest Research in Australia, Annual Report (1976-1977), pp. 15, 16 and 17.

Primary Examiner—W. Donald Bray

[57] ABSTRACT

A mechanized tree pruner is mounted on the boom of a prime mover so the pruning head can be moved up and down a standing tree. The head is comprised of a main frame on which is mounted two delimbing stations each of which has a pair of movable delimbing knife chains mounted on grapple type arms. Below each station is a positioning means for orienting the head with respect to the standing tree. When the arms are closed causing the knife chains to encircle the tree, upward movement of the pruning head will then result in all limbs and branches being severed as they are impacted by the knife chains.

5 Claims, 6 Drawing Sheets

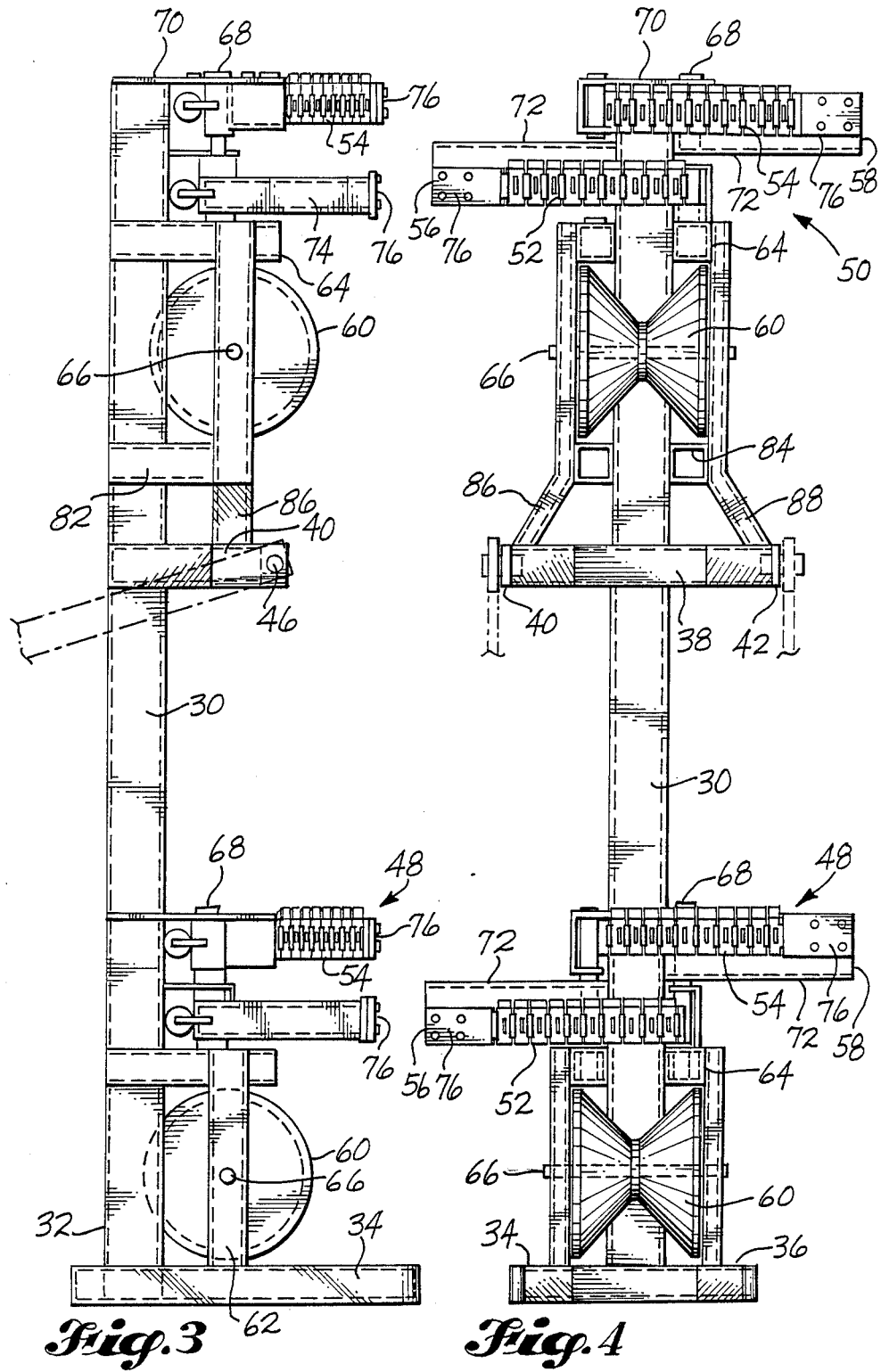

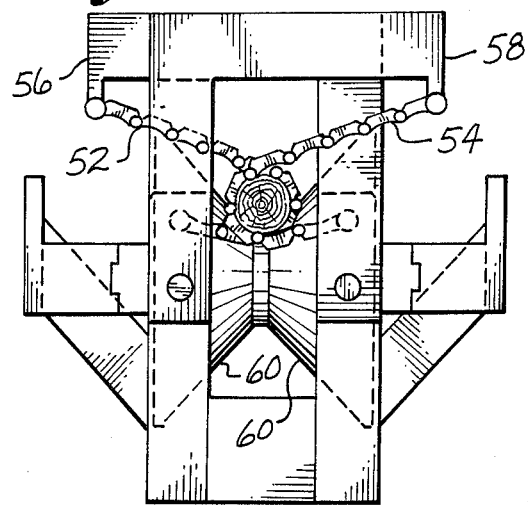
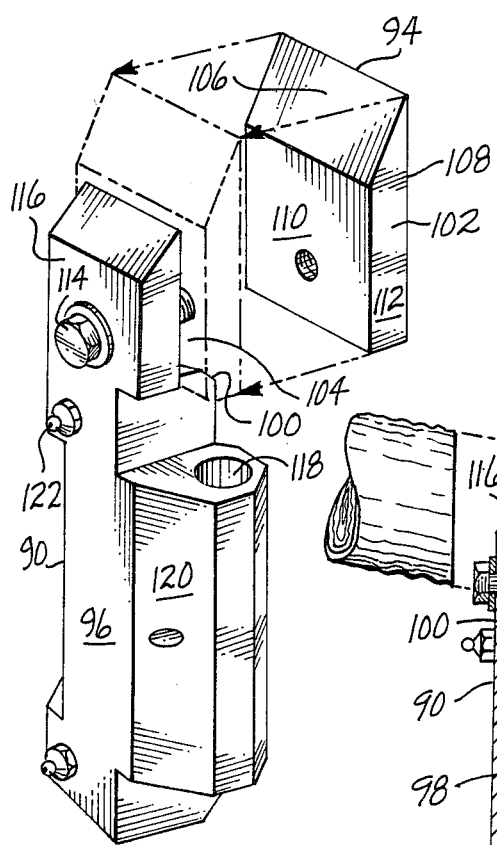
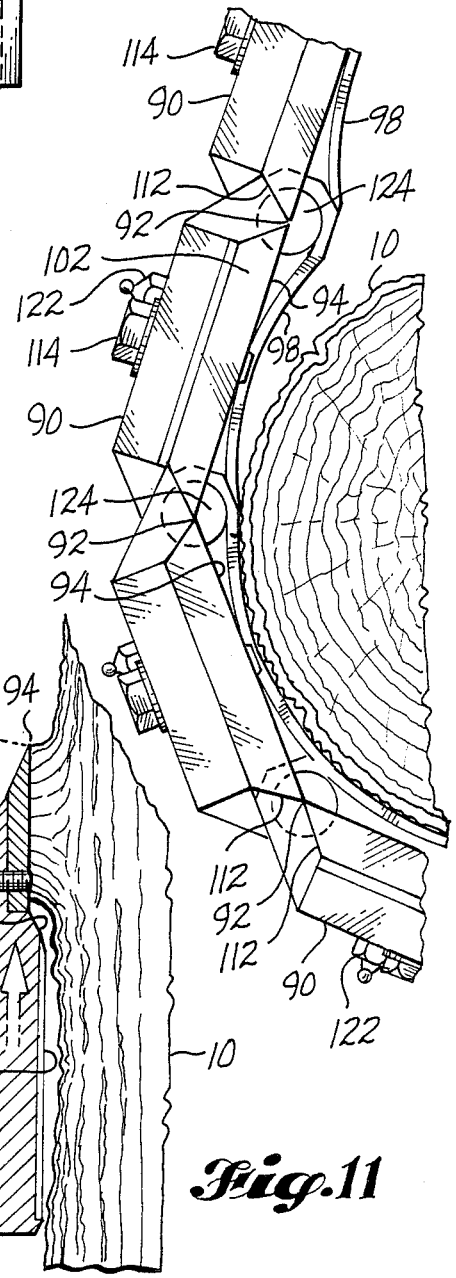

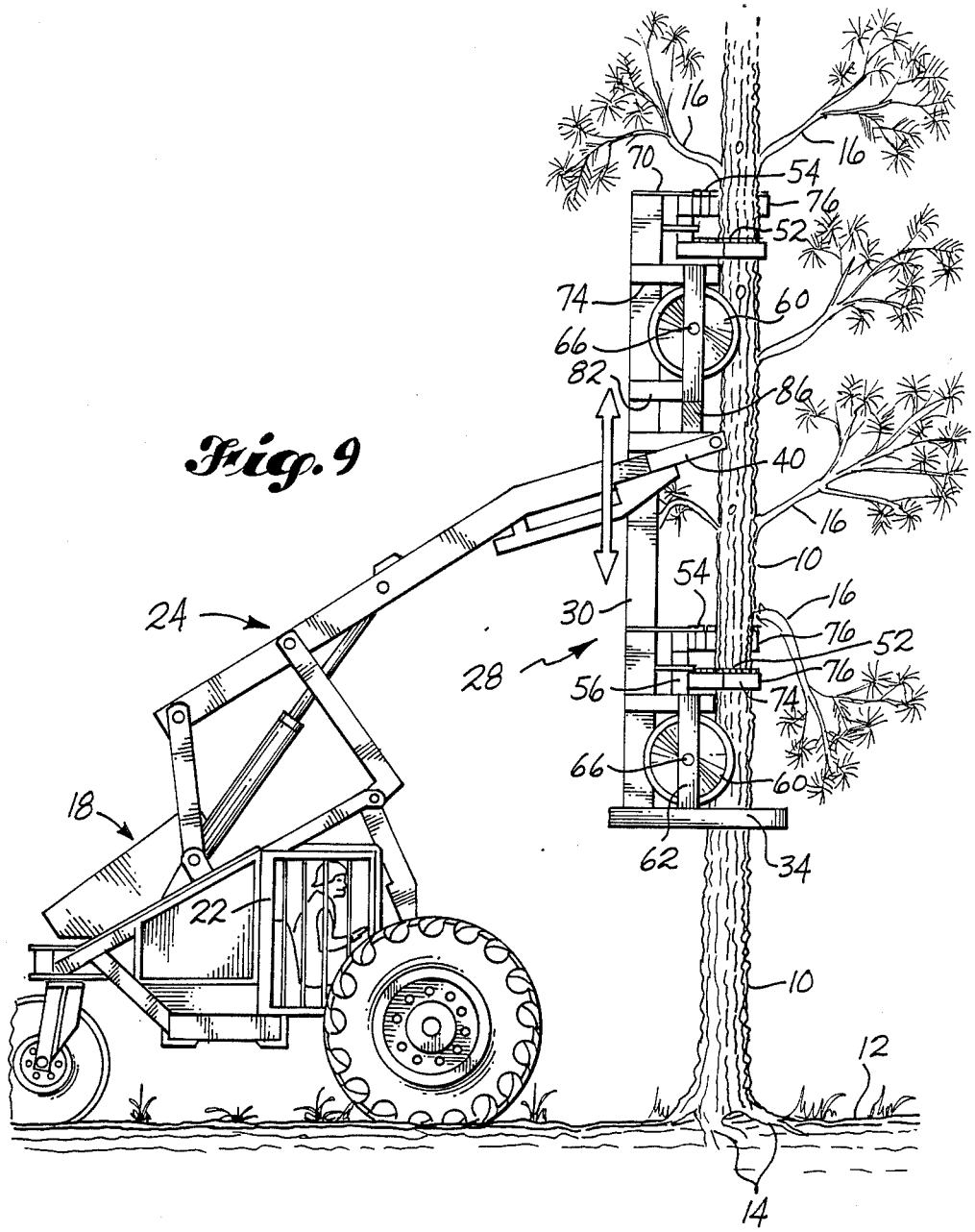

TREE PRUNER

BACKGROUND OF THE INVENTION

The present invention relates generally to pruning of standing trees. More particularly it relates to a pruning head mounted on the boom of forestry equipment that operates to sever attached limbs from a standing tree as the head moves up the tree.

In modern commercial forestry operations where trees are grown more like crops with scientifically applied periodic attention it has been found that the growing cycle can be shortened with the same amount, more, and/or better quality wood volume being produced per acre of land. For example, such techniques can include preparation of the ground prior to planting new seedlings, replanting with genetically improved seedlings, fertilization, pre-commercial thinning, and pruning of limbs. It is the pruning step to which the present invention is directed. When a tree grows in the early years limbs naturally occur and grow laterally out from the main stem of the tree. As the main growth continues upwardly in the stem and as the tree reaches substantial vertical height, usually the lower limbs will simply die and will either fall by natural causes or will remain with the tree until final harvest. Of course, even in the final stages of a tree's life, there will be limbs at the upper reaches of a standing tree.

It has been learned that a pre-commercial thinning step where the smaller, weaker trees are thinned from a stand will enhance the growth of the remaining trees. This pre-commercial thinning step can take place approximately ten years after the initial replanting. Another beneficial step that has been learned is a pruning step after a period from approximately 10-14 years after the pre-commercial thinning step. If the remaining trees are pruned to a height of approximately 20 feet above the ground, a substantial amount of improved wood will be obtained after final harvest which will then usually occur after the passage of another 10-15 years. What has been learned is that if the limbs up to the approximate height of twenty feet are pruned away, diameter growth will continue to add layers of clear wood over the length where limbs have been pruned away. This has a direct relationship to increasing the value of the wood by removing the limbs that would become knots in finished lumber products.

Such knots tend to chip or drop out when the timber is being finished and also spoil the finish for many types of products. In plywood, knots may drop out to cause imperfections in the surface finish so a veneer of clear wood is often sought for the surface layer. In addition, the presence of knots prevents the even distribution of stress along a section of timber. If the limbs or branches are pruned close to the trunk, wood which grows beyond the stubs of the branches as the tree grows in diameter is knot free. The closer the branch is pruned to the trunk, and consequently the shorter the stub, the greater the yield of knot free timber.

Others have contemplated tree pruning and there are several examples in the prior art of tree pruning mechanisms that are designed to be motivated up a certain length of a standing tree to remove limbs and branches. One such device is that disclosed in U.S. Pat. No. 3,385,332 to Otterbach et al in which a motorized device travels up the tree stem in a helical path and has circular saws or chain saws that are operable to sever the limbs and branches. Another device is that disclosed in the Annual Report (1976-1977) of CSIRO Division of Forest Research in Australia wherein a prototype mechanized high pruning device consists of a pruning head bearing an array of six knives which is attached to a vertical mast. The mast is carried on a pivotal mounting and aligned with the tree trunk by means of a pair of hydraulic cylinders. The knives in the head are kept in close contact with the trunk and the branches are pruned as the head is moved up the mast.

It is also known that a knife chain may be used after it is wrapped about a stem for delimbing the stem when the chain or the stem is moved relative to the other. An example of such a delimbing arrangement is disclosed in U.S. Pat. No. 3,643,708 to Lindblom. The Lindblom patent discloses a pair of pivotally mounted curved arms on which are mounted linked together knife blades which serve to shear the limbs. Another similar disclosure is contained in the German Offenlegungsschraft No. 2,720,149.

All of the above-cited prior art disclosures have deficiencies with respect to providing a cost effective, quality tree pruner. What is needed is a tree pruning mechanism that can be manipulated quickly in the forest to maneuver into position to prune selected trees. Once in position, the pruning mechanism should then act quickly to remove those limbs and branches that are desirable for removal close to the bole without excess damage to the tree. In addition, of course, unless a robotic version is developed, safety is essential for the operator who is in close proximity to the actual pruning. Obviously when limbs and branches are pruned from a standing tree, the material must be safely handled.

Accordingly from the foregoing one object of the present invention is to quickly and efficiently prune selected trees to a predetermined height.

Another object of this invention is to provide a pruning mechanism that operates to shear the limbs and branches from the tree very close to the surface, thereby leaving very short stubs.

Yet a further object is to provide a pruning mechanism that will not significantly damage the tree during the pruning operation.

Still a further object of the present invention is the provision of a multiple station pruning mechanism having a plurality of shearing knives which will serve to prune the tree faster than a single shearing station mechanism.

These and many additional objects of the present invention will be better understood and more fully appreciated upon reading the specification to follow in conjunction with the attached drawings.

SUMMARY OF THE INVENTION

Briefly stated, this invention is practiced in one form by mounting a gimbaled pruning head on the boom of a prime mover where the boom is powered in order to move the head in a vertical direction. The head is comprised of a main frame on a gimbaled mounting and two delimbing stations mounted on the main frame with each having a pair of delimbing knife chains and two grapple type arms that hold the delimbing chains. Positioned vertically below each delimbing station is a flat or V-grooved roller that functions to position the head with respect to the standing tree and to protect the surface of the tree. The head is positioned against the tree with the tree seated against the rollers. Then the grapple arms close and wrap the delimbing chains substantially around the circumference of the tree at the vertical height where each delimbing station is then positioned. The boom on the prime mover is then activated, lifting the head so that it moves substantially vertically up the tree and as the limbs and branches are encountered, the delimbing chains with their knife edges remove the branches.

BRIEF DESCRIPTION OF THE DRAWINGS

FIG. 3 is a side elevation view depicting the pruner head.

FIG. 4 is a front elevation view also depicting the pruner head.

FIG. 7 is a view similar to FIGS. 5 and 6 but shows the arms closed about a relatively small diameter section of a tree.

FIG. 8 is a partial top view of a pruning station illustrating the knife segments pivoting as a delimbing chain encircles a tree.

FIG. 9 is a side elevation view showing the prime mover moving the pruning head up the standing tree pruning limbs as it moves.

FIG. 10 shows a detailed perspective view of one knife segment within a delimbing chain.

FIG. 11 is a side elevation view depicting a single knife segment as it is forced upwardly through a limb.

DETAILED DESCRIPTION OF THE PREFERRED EMBODIMENT

Figure 1:
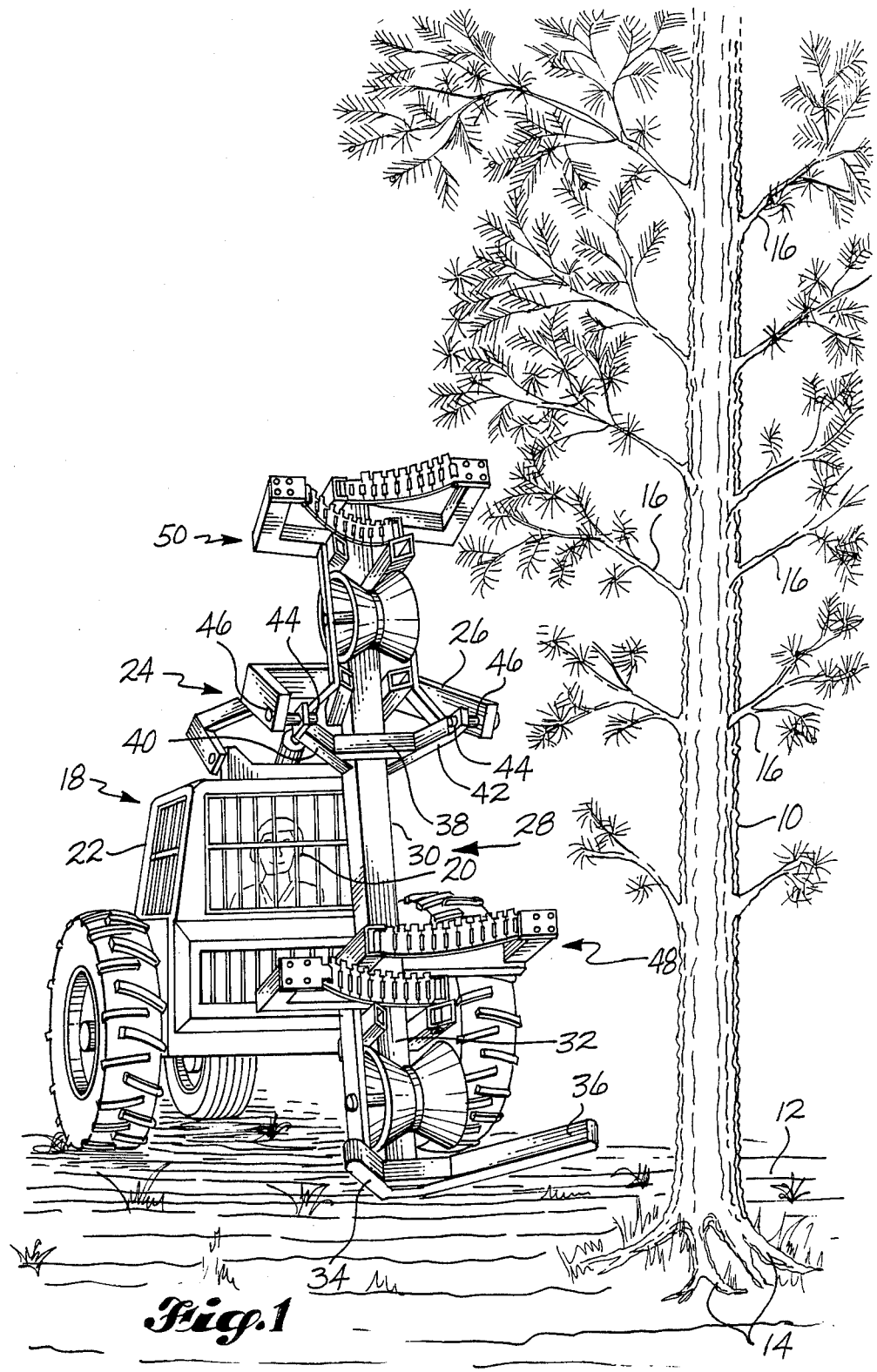
FIG. 1 is a front perspective view showing the prime mover with the attached pruner head approaching a standing tree to be pruned.

Referring first to FIGS. 1-4, the basic structure of the pruner head of the present invention will be described. In FIG. 1 a typical standing tree is generally indicated at 10 which extends upwardly in a substantially vertical direction from ground level 12. A plurality of roots 14 are indicated to show that the upstanding tree 10 is rooted within the ground. A plurality of laterally extending limbs 16 are shown at various heights up to the tree stem. Shown approaching tree 10 is a typical commercially available four or three wheeled prime mover generally indicated at 18. Commercially available prime movers like the Mor-Bell Mark V and Hydro Ax 121 can be obtained from such distributors as Moore-Bell and Omark Industries. These typical prime movers are usually powered by an internal combustion engine and are designed to operate in woods terrain. An operator indicated at 20 within cab enclosure 22 functions to both steer the prime mover and to control the functions that it and the pruner will perform. Atop prime mover 18 there is mounted the boom structure generally indicated at 24 which extends upwardly and outwardly in front of prime mover 18. Boom structures are also well known and are powered to cause the working end of boom structure 24 to perform various functions. In the present application, the front portion of boom structure 24 is comprised of a U- or V-shaped yoke 26 on which the pruner head, generally indicated at 28, is gimbaled. Pruner head 28 is thereby able to be moved in the vertical direction by causing boom structure 24 to move vertically up and down.

Turning now to the pruner head assembly itself, the main structural element in pruner head 28 is a generally upstanding support beam 30 which at the bottom thereof, indicated at 32, supports the centering arms 34, 36. Approximately two thirds up the height of support beam 30 is the mounting structure 38 for the gimballed mounting means. A pair of laterally spaced support arms 40, 42 have a distance therebetween adequate to accept the largest diameter tree to be pruned. At the end of each arm 40, 42 are laterally opposed gimbal pins, each indicated at 44 which are adapted to fit within structured aperatures, each indicated at 46 and located in the ends of U-shaped yoke portion 26 of boom structure 24.

Spaced apart vertically on support beam 30 is a pair of delimbing stations with the lower one being indicated generally at 48 and the upper one being indicated generally at 50. Each delimbing station 48, 50 is comprised of pairs of delimbing knife chains each indicated generally at 52, 54, pairs of pivotal grapple arms each indicated generally at 56, 58 that hold the delimbing knife chains, and a V-groove roller indicated generally at 60. At each delimbing station 48, 50 the knife chains 52, 54 are mounted on grapple arm 56, 58 such that they will be in horizontal planes with their respective knife edges substantially in vertical planes, as will be more fully described later. At both lower and upper delimbing stations 48, 50 suitable vertical beams 62 and forwardly extending horizontal beams 64 serve to support the V-groove rollers 60 in a position forward of the vertically extending support beam 30. Vertical beams 62 can be attached to the centering arms 34, 36. The cross-sectional shape of roller 60 is selected to accommodate the general size of tree to be pruned. It may in some cases by substantially U-shaped, or even flat. The cross-sectional shape is selected to center the tree with respect to the pruning head and to minimize the tree damage when the rollers contact the trees. An axle 66 extends through each roller and is supported in bearings (not shown) so that each roller may freely rotate. In one embodiment the inside surfaces of the rollers can be coated or otherwise treated with a soft durable composition that again is selected and provided to minimize damage to the standing tree. Positioned just above the lower roller 60 is the lower pair of pivotal grapple arms 56, 58 holding their respective knife chains 52, 54. Each of the pivotal grapple arms 56, 58 in a pair are offset vertically. Each grapple arm is mounted on a suitable vertically extending bearing each indicated at 68, thereby allowing each grapple arm to pivot in a horizontal plane vertically offset and independently from the other. Each respective bearing 68 is, for example, laterally spaced from the other a distance that is approximately the diameter dimension of the largest tree that will be pruned. Serving to support vertical bearings 68 in their proper orientation and also to support one end of the knife chain as will become apparent later is the suitable horizontal support plate 70 which together with the horizontal support beams 64 serve to hold and support the grapple arms and knife chains. Each grapple arm 56, 58 has its respective pin connection point located on the horizontal axis of its attendant roller 60.

Figure 2:
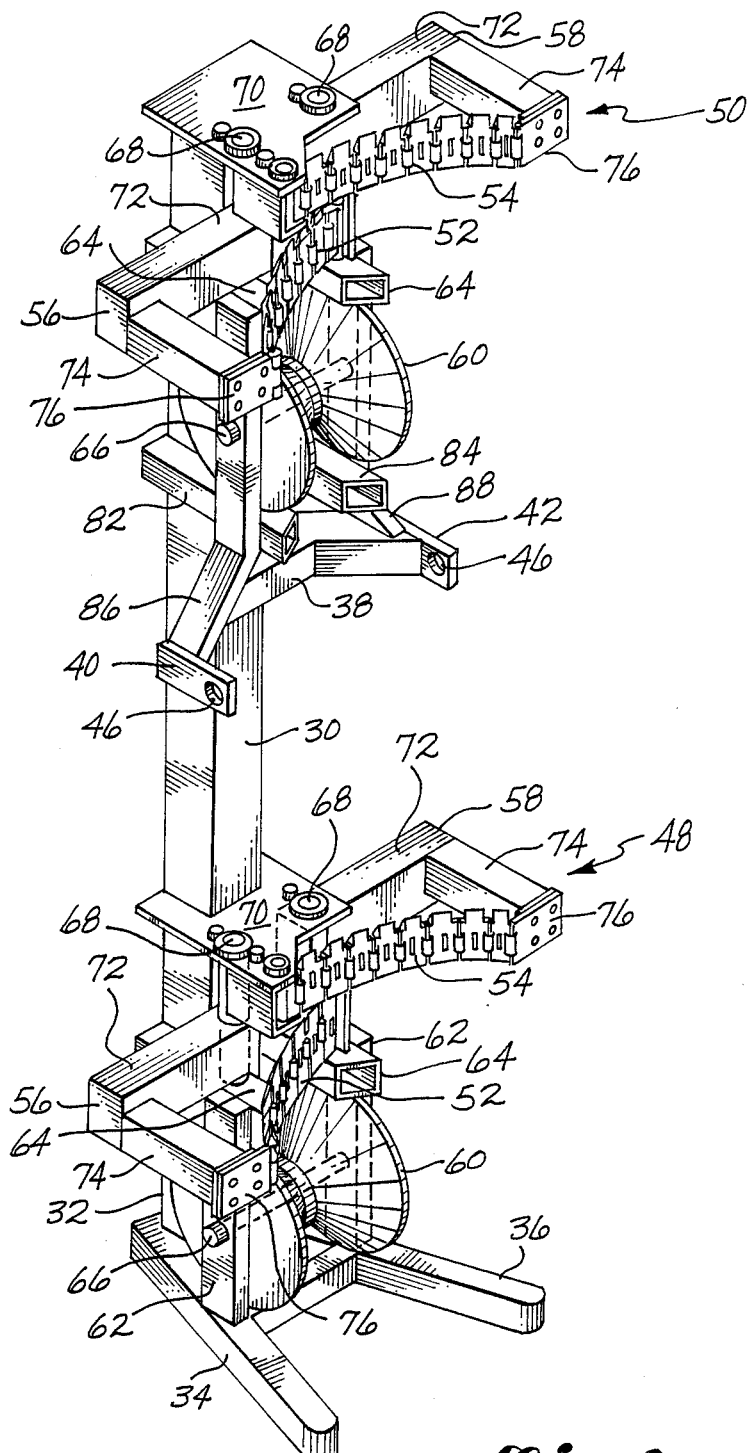
FIG. 2 is an upstanding perspective view showing the pruner head removed from its prime mover.
Figure 5:
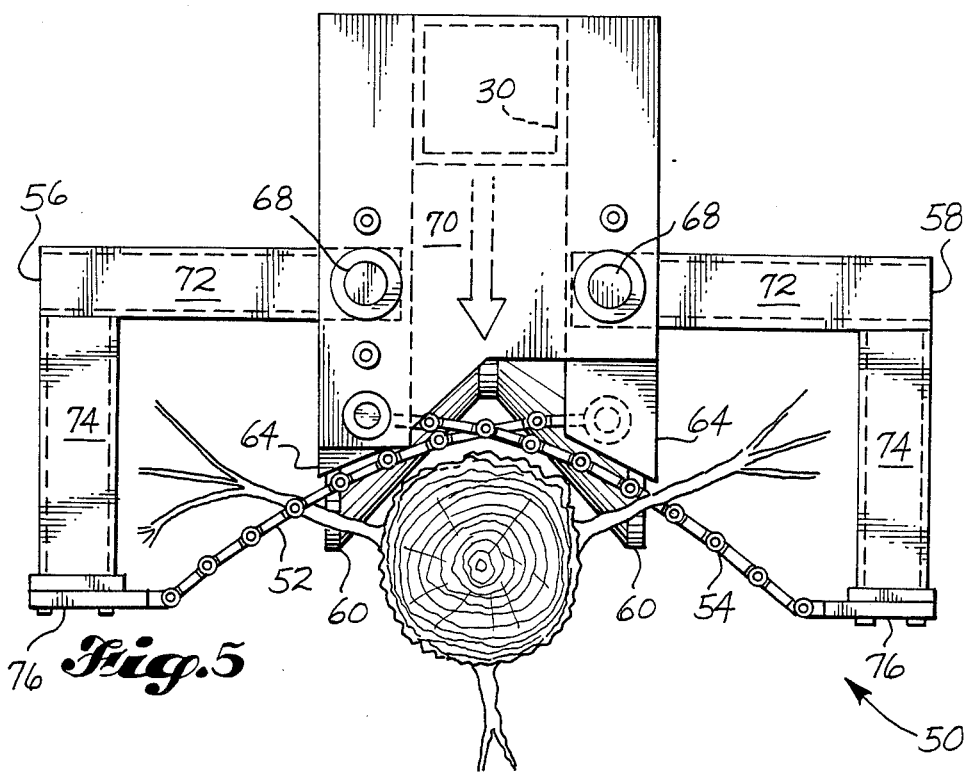
FIG. 5 is a top view, looking down as one of the pruning stations approaches the tree with the arms open.

Each grapple arm is substantially L-shaped in a horizontal plane and is comprised of a base arm member 72 and an outwardly extending arm member 74. In their retracted positions grapple arms 56, 58 will have a base arm member 72 extending outwardly substantially at a 90 degree angle from the direction of travel of the pruner head and prime mover. This is the orientation as depicted in FIG. 2. It has been found that if each base arm member 72 and outwardly extending arm member 74 has a dimension that is approximately twice the largest diameter tree that is to be pruned, satisfactory results can be obtained. Arm dimensions are selected to give satisfactory tree clearance on opening and closing, suitable mechanical advantage in closing and preloading chain, clearance for chain during pruning, and correct configuration related to geometry of pivot points, arm lengths, tree sizes, chain length, and link width. On the outer ends of arm members 74 are attachment plates 76 for supporting the outer end of a knife chain. Adjustable attachment plates 76 are removably affixed to the ends of arms 74 for easy removal. Serving to provide the motive force for pivoting each of the grapple arms 56, 58 are pairs of hydraulic cylinders, each indicated at 78, 80, respectively. Cylinders or other powered means 78, 80 when activated cause the grapple arms to rotate about their respective pivot points from their at-rest position toward their fully closed position which is at an angle approximately 90° from the retracted position. Any suitable means for rotating the grapple arms can be provided to perform the required function.

At the upper delimbing station 50 all component parts are substantially identical to those at lower delimbing station 48 with the exception of certain structural elements provided in view of the fact that the upper station 50 is elevated above the arms 40, 42. In the upper delimbing station 50 a pair of additional horizontal forwardly extending support beams 82, 84 are provided as are inclined strut members 86, 88 which serve to support arms 40, 42.

Figure 6:
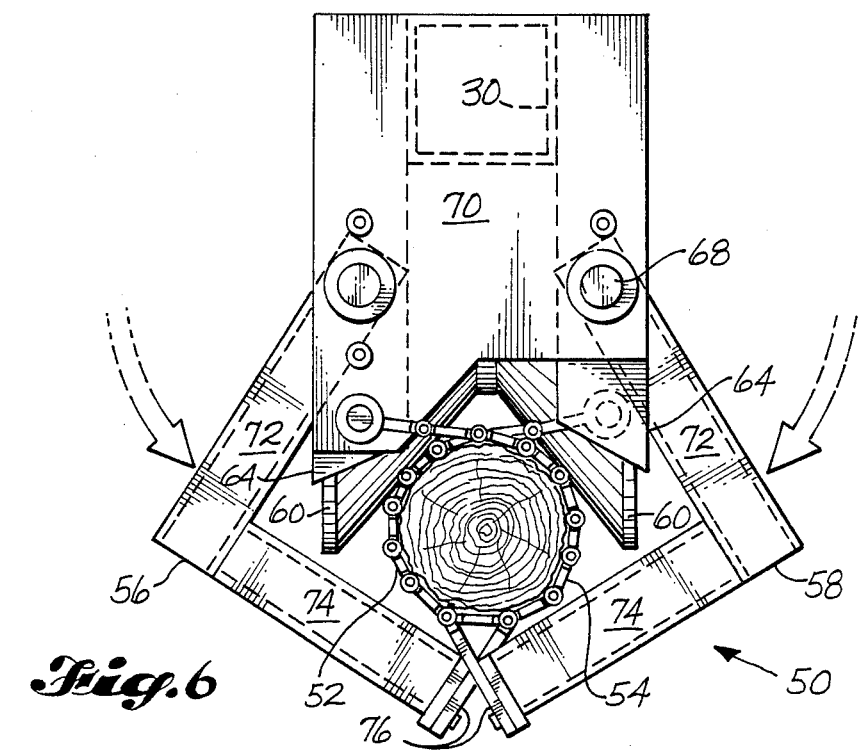
FIG. 6 is a view similar to FIG. 5 showing the arms closing about the tree.

Turning now to FIGS. 5-8 the sequence is depicted for moving pruner head 28 toward tree 10 and then into engagement therewith whereby the upper and lower rollers 60 will engage the surface of the tree. Obviously it is prime mover 18 or the boom that moves the pruner head into engagement with the tree to be pruned. In the starting position, the pruner head 28 will be substantially at ground level with the centering arms 34, 36 serving to aid the operator in centering the pruner head for engagement with the tree. The centering arms 34, 36 are also adapted to engage the ground if the boom structure 24 allows pruner head 28 to rest on the ground. With the grapple arms open and the tree centered in the V-groove rollers 60, the upper and lower sets of grapple arms 56, 58 are activated to be rotated and thereby closed about the upstanding tree. In FIG. 6 a representative tree is depicted that will be substantially the maximum diameter to be pruned. After the arms have been rotated, the powered means 78, 80 are flexibly biased to wrap the cooperating knife chains to the maximum extent about the tree at the vertical height on the tree where they are engaged. Similarly, FIG. 7 is representative of the smallest diameter that can be encircled and still have full coverage by the upper pair of knife chains 52, 54. At the minimum diameter it will be noted that the pair of upper grapple arms 56, 58 are rotated substantially their full 90° causing the tree to be fully encircled by the upper pair of knife chains 52, 54. This closure configuration will be representative for the minimum diameter encountered, for example, when the pruner head is at its maximum vertical reach.

The enlarged partial top view in FIG. 8 shows a portion of one knife chain being wrapped about the tree. A plurality of individual knife segments each indicated at 90 are pivotally mounted at pinned connection points indicated generally at 92 and make up the knife chains. The upper edges 94 on each knife segment 90 are knife edges that function to shear off the limbs or portions of limbs encountered as the pruner moves up the tree. In the embodiment depicted there is a substantially continuous cutting edge formed by the plurality of adjacent knife edges 94 each terminating on the axes of the pinned connection points 92. After the upper and lower pairs of grapple arms 56, 58 are closed, each knife chain will be wrapped about substantially half of a tree diameter and therefore a continuous knife edge will encircle the tree. As will be more fully described later, each respective knife edge is spaced laterally outwardly from the surface of the tree.

In FIG. 9 the boom 24 is being motivated upwardly thereby carrying pruner head 28 up the tree and any limbs that are encountered are severed by the knife edges shearing through them as they are encountered. After a predetermined height is reached the grapple arms are opened and the pruner head backed away from the pruned tree.

Referring now to FIGS. 10 and 11, the knife segments 90 will be more fully described. Knife chains are known, although none are known having the present configuration and that perform the pruning function as efficiently as the present design. Briefly each knife segment is comprised of a support base member 96 having a vertically extending curvilinear front surface 98 adapted to be the sliding surface against which the surface of the tree will slide as the pruner head moves up the tree. Extending along each upper front edge of front surface 98 is a chamfered edge 100 that will be one of the slide impact surfaces as each knife segment moves up the tree. Individual knife plates 102 are permanently or removably mounted on segments 90 in an L-shaped cutout 104. Each individual knife plate 102 has knife edge 94 extending along its top front edge and has a beveled back surface 106 for completion of a chisel type tooth. Along each vertical side edge of plates 102 is a substantially flat surface which is beveled from the front substantially flat surface 108 of plate 102 and the rear surface 110 to allow the segments to bend at least 45° both ways. Each edge is indicated at 112. As previously noted, the front vertical side corners of each knife plate 102 are positioned so as to be directly over the vertical axes of their respective pinned connection points 92 in the knife chain. Holding each knife plate 102 on its support base member 96 when it is resting in L-shaped cutout 104 is a suitably sized bolt 114 extending through an upwardly extending extension 116 on the rear surface of base member 96. Bolts 114 serve to removably attach each knife plate 102 to its respective base member 96. Alternatively, the knife blades can be made integral with the base member. Along one vertical side edge of base member 96 is an elongated vertical opening 118 within pin support 120. Along the other vertical side edge of base member 96 will be vertically spaced pin supports each having an aperture (not shown). Grease nubbins 122 are provided on the rear of base member 96 to properly lubricate the pinned connection points. Of course, when adjacent knife segments 90 are connected together, the spaced pin supports will be in alignment with apertures and pins 124 will thereafter be inserted to connect the segments together into the functional delimbing knife chains. The pins connecting the segments are retained by means of easily installed/- removed roll pins. It has been found that for pruning typical standing trees the knife plates 102 can have a front vertical dimension of approximately 3 inches and a lateral width dimension along the knife edges of approximately 2 to 2½ inches. As depicted in FIG. 11 with a 3 inch high knife plate that is recessed slightly inwardly from the upper leading edge on the vertical front surface 98 results in a climbing angle as indicated of approximately 8°. It has been found that a ⅜" offset gives excellent results.

OPERATION OF THE INVENTION

When operating in the field, the pruner head 28 on its gimballed mounting is free to rotate within the U-shaped yoke portion of the boom. As the operator approaches a tree to be pruned, the boom will be carrying the pruner head 28 substantially at ground level. The operator will generally align the roller 60 so as to center them with respect to the upstanding tree. During this operation, the grapple arms are all in their open position allowing engagement of the V-rollers will the tree. Upon firm engagement, the operator will activate the powered means to close the grapple arms thereby encircling the tree stem with the pairs of delimbing knife chains. Once the upper and lower delimbing stations are funcitona, the operator then activates the boom structure 24 to move the pruning head upwardly thereby forcing the cutting edges on the delimbing knife chains through each limb encountered. As the limbs are sheared off, they simply drop to the ground. Typically the maximum vertical boom travel will be a distance whereby the vertical travel of the lower set of delimbing knife chains will slightly overlap the starting location of the upper delimbing knife chains, thereby providing complete delimbing over a predetermined height. After the pruner head has reached its maximum vertical height, the grapple arms are opened and the pruner head moved away from the pruned tree. The cycle will then be repeated on the next tree to be pruned.

While the preferred embodiment of the present invention has been described certain changes and modifications may occur to those skilled in the art. For example, on alternate embodiment may include the elimination of sharp knife edges on the delimbing chains. Oftentimes lower limbs are easy to remove simply by impacting them with a blunt object and therefore the lower set of delimbing chains could be provided with blunt upper edges rather than knife edges. Various other changes and modifications may occur to those skilled in the art and all such changes and modifications are intended to be included within the scope of the appended claims.

I claim:

1. A pruner for severing limbs from a tree, comprising:
   a frame,
   at least two delimbing stations on the frame positioned substantially in an inline relationship,
   each delimbing station having at least a pair of movable grapple arms and flexible limb severing chains supported thereon, and
   means for opening and closing the grapple arms about a tree whereby the flexible chains can be wrapped substantially about the entire circumference of the tree.

2. The pruner as in claim 1 in which the frame is gimbled on the boom of a prime mover.

3. The pruner as in claim 2 in which the boom has powered means associated therewith to move the frame at least in a vertical direction.

4. The pruner as in claim 1 in which the limb severing chains have knife edges on their operative ends.

5. The pruner as in claim 1 further including at least a pair of rollers each located in close proximity to the delimbing stations and disposed on the frame and operable to in part, position each delimbing station relative to a tree.

* * * * *